May 23, 1967  A. H. WILLINGER  3,321,081
AQUARIUM FILTER APPARATUS
Filed June 18, 1964  3 Sheets-Sheet 1

INVENTOR.
ALLAN H. WILLINGER
BY
Friedman & Goodman
ATTORNEYS

May 23, 1967  A. H. WILLINGER  3,321,081
AQUARIUM FILTER APPARATUS
Filed June 18, 1964  3 Sheets-Sheet 2
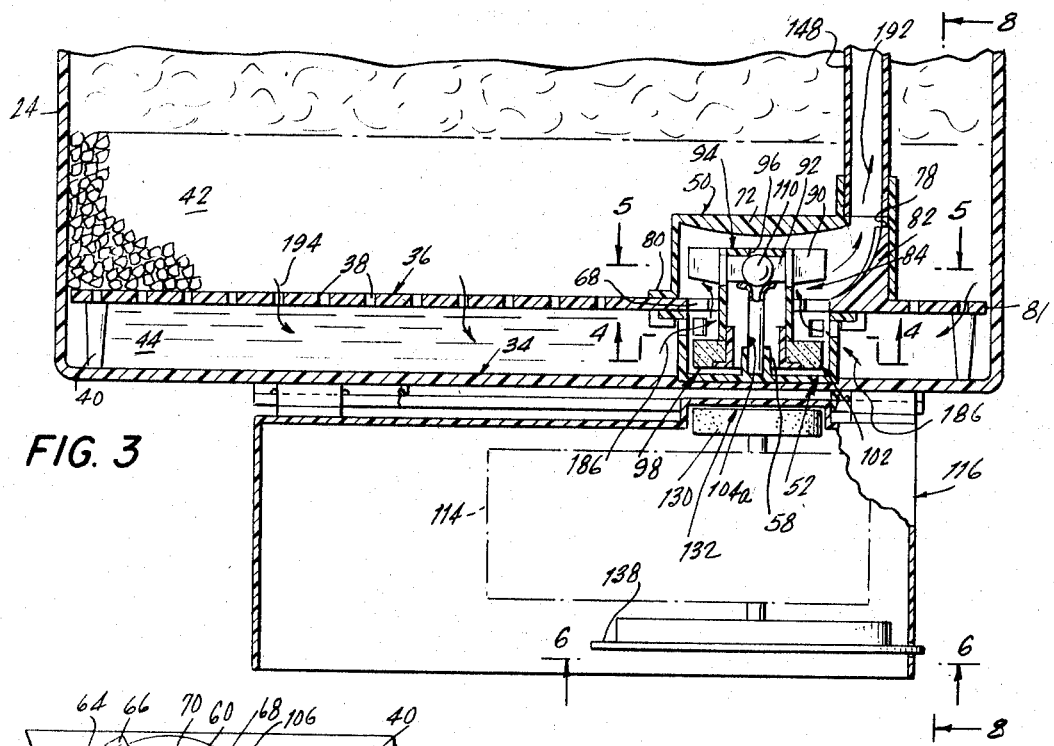
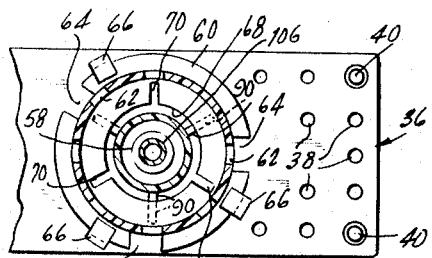
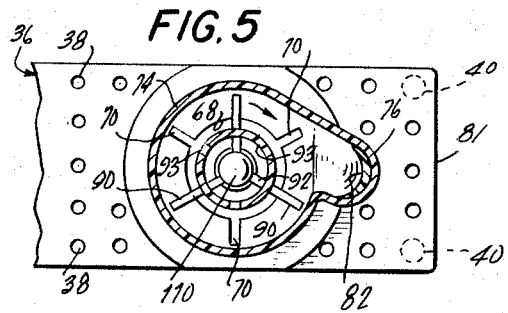
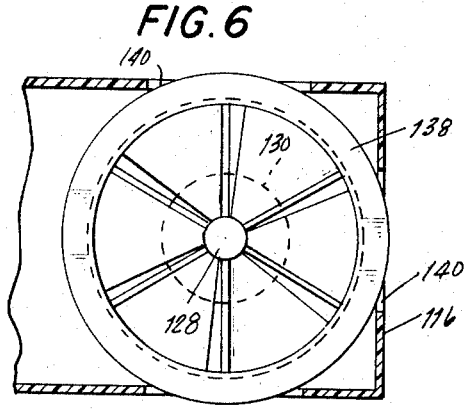
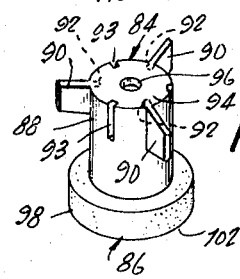
INVENTOR.
ALLAN H. WILLINGER
BY
ATTORNEYS

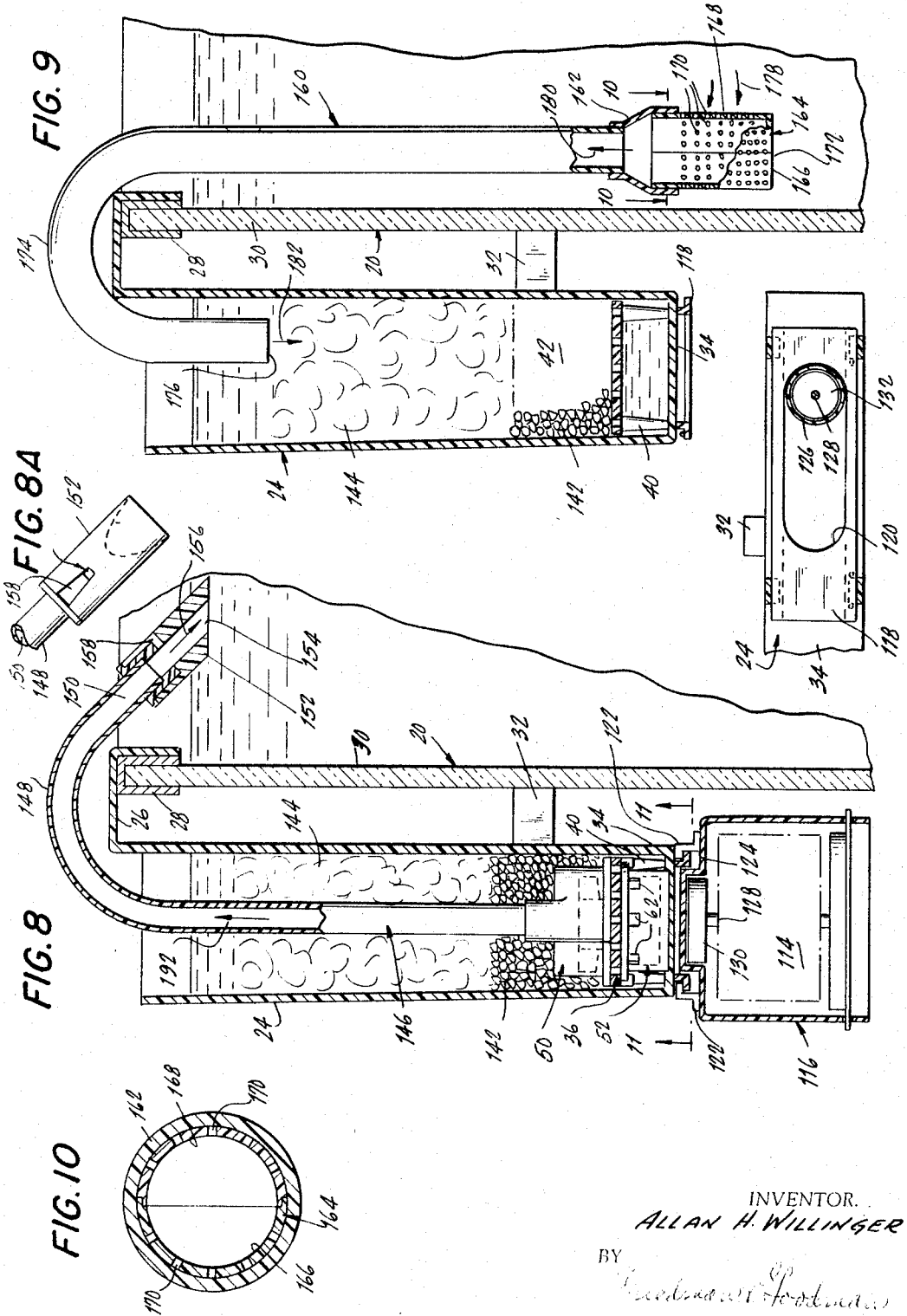

United States Patent Office 3,321,081
Patented May 23, 1967

3,321,081
AQUARIUM FILTER APPARATUS
Allan H. Willinger, New Rochelle, N.Y., assignor to Aquariums Incorporated, Maywood, N.J., a corporation of Delaware
Filed June 18, 1964, Ser. No. 376,105
6 Claims. (Cl. 210—169)

The present invention relates in general to an aquarium water circulation device and, in particular, to an aquarium filter having an improved water circulation arrangement.

In the aquarium hobby, it has been found desirable under many circumstances to circulate aquarium water particularly for the purposes of aeration and filtration. Heretofore, such circulation has been largely accomplished by variety of air-lift arrangements whereby water circulation for the foregoing purposes is induced by means of compressed air. Said arrangements have distinct disadvantages and limitations, such as, for example, the necessity for the use of electrically-operated air pumps which may be of the vibratory or piston type and the attendant air hose and valving arrangement. The equipment is often noisy and troublesome to operate and is, at best an inefficient method for generating the quantity of water circulation required for optimum aquarium conditions.

In view of the foregoing, it is an object of the present invention to provide an aquarium water circulation arrangement which obviates the foregoing disadvantages of the prior art.

It is another object of the present invention to provide an improved water-circulation arrangement for an aquarium of relatively high efficiency which provides a relatively large amount of water flow, produced by a relatively small pump arrangement.

It is a further object of the present invention to provide an improved water-circulation arrangement for an aquarium which is provided with a highly novel pump formed of a relatively small number of inexpensive parts which nevertheless is highly efficient in operation and has a relatively long trouble-free life.

In accordance with the foregoing object, it is another object of the present invention to provide a pump which has a minimum amount of friction and which cannot burn out.

In accordance with the foregoing object, it is a still further object of the present invention to provide an improved water-circulation arrangement for an aquarium filter which is provided with a pump which is not subject to injury or damage even if the pump should become clogged or jammed.

Other and further objects and advantages of the present invention will become readily apparent to one skilled in the art from a consideration of the following specification, taken in connection with the appended drawings.

In the drawings which illustrate the best mode presently contemplated for carrying out the invention:

FIGURE 3 is a fragmentary, vertical sectional view through the aquarium filter pursuant to the present invention;

FIGURE 4 is a fragmentary sectional view, taken on the line 4—4 of FIGURE 3;

FIGURE 5 is a fragmentary sectional view, taken on the line 5—5 of FIGURE 3;

FIGURE 6 is a fragmentary sectional view taken on the line 6—6 of FIGURE 3;

FIGURE 7 is a perspective view of the rotor or impeller utilized in the aquarium filter pump;

FIGURE 8 is a sectional view on an enlarged scale, taken on the line 8—8 of FIGURE 3;

FIGURE 8A is a fragmentary view of the aeration device used in the water-circulation arrangement of the present invention;

FIGURE 9 is a sectional view, taken on the line 9—9 of FIGURE 1;

FIGURE 10 is a sectional view on an enlarged scale, taken on the line 10—10 of FIGURE 9; and FIGURE 11 is a sectional view, taken on the line 11—11 of FIGURE 8.

Figures 1, 2:
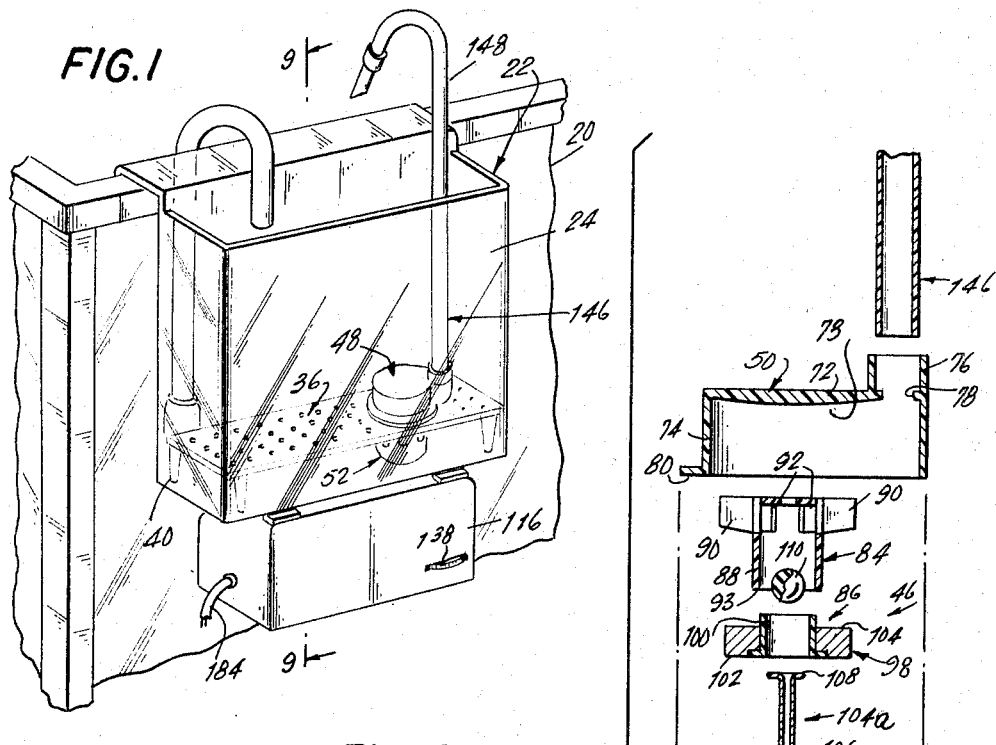
FIGURE 1 is a fragmentary, perspective view of an aquarium filter provided with an improved water-circulation arrangement pursuant to the present invention.
FIGURE 2 is an exploded view on an enlarged scale of a pump and associated parts pursuant to the present invention.

Referring now to the drawings in detail, there is shown a conventional aquarium tank 20 which is provided with a filter which is generally indicated by the reference numeral 22 pursuant to the present invention. The filtration device 22 is of the external type and, as here shown, comprises a filter receptacle 24 which is suspended on the outer surface of the aquarium tank 20. More specifically, the filter receptacle 24 is provided with a lateral or rearwardly-extending flange 26 which is hooked over a preferably metallic rim 28 provided on the adjacent side wall 30 of the aquarium tank 20. A spacer 32 extending between the tank 20 and the filter receptacle 24 maintains the receptacle in upright position. As here shown, the filter receptacle 24 is essentially rectangular in conformation and is provided with a bottom wall 34 on which there is mounted a platform 36. The platform is provided with a plurality of perforations or slots 38 and is provided at several locations thereof with a leg 40.

The legs 40 dispose the rectangular platform 36 in spaced relation above the bottom wall 34 of the filter receptacle 24 when the platform is mounted within the filter receptacle, as shown, for example, in FIGURE 3. The platform, when seated within the filter receptacle, serves to define with the latter a pair of chambers 42 and 44. Chamber 44 is defined below the platform 36 and is hereinafter referred to as a clean water chamber, and the chamber 42 is defined above the platform 36 and is hereinafter referred to as a filter chamber.

Pursuant to a highly novel aspect of the present invention, the platform 36 mounts a centrifugal pump which is generally indicated by the reference numeral 46. The pump 46 is provided with a two-part housing generally indicated by the reference numeral 48 within which the movable pump parts are mounted. The pump housing 48 comprises an upper housing member 50 and a cooperating lower member 52. As here shown, the lower housing member 52 is a cylindrical element having a cylindrical wall 54 extending upwardly from a bottom wall 56. The bottom wall 56 is provided with an upwardly-extending central bearing seat 58 and the vertical bounding wall 54 is provided at the upper end thereof with a lateral flange 60. The up-standing wall 54 is provided also with a plurality of apertures 62 which define water ports or passages through the housing member 52. As best shown in FIGURE 4, the flange 60 is provided with three discontinuities or interruptions which define recesses 64 therein. The lower housing member 52 is mounted on the lower surface of the platform 36. For this purpose, the latter is provided with three circularly spaced hangers or supports 66, as best shown in FIGURES 2 and 4. The hangers 66 encompass a circular aperture 68 defined in the platform 36. The aperture 68 is provided with three radial, outwardly-extending slots 70 which are defined in the platform 36. The lower casing member 52 is removably mounted on the under surface of the platform 36, immediately below the aperture 68, by first aligning the recesses 64 with the hangers 66 so that each hanger extends within a recess, the flange sections 60 being in abutment with it under surface of the platform. Thereafter, the lower casing member 52 is rotated so that each flange segment 60 is engaged by a hanger 66 which mounts the lower casing member on the lower surface of the platform 36 so as to enclose or encompass the aperture 68 below the latter, as best shown in FIGURE 3.

The upper housing member 50 is, as here shown, a cylindrical element having a substantially circular top wall 72 from which there depends a cylindrical vertical wall 74. It will be noted that wall 72 has an arcuate or convex under surface 73 to relieve air which may be trapped thereunder (see FIGURE 2). The top wall 72 is provided excentrically thereof with an integral, upwardly-extending tubular segment 76. The tubular extension 76 is provided at the bottom thereof with a circular shoulder or detent 78, the function of which will presently appear. At the free marginal edge thereof, the vertical wall 74 is provided with a lateral flange 80.

As best shown in FIGURES 3 and 5, the platform 36 which is provided with the previously described aperture 68 adjacent one end 81 thereof, is provided also between said aperture and said end with an integral, upwardly-extending water-flow-directing portion 82. As best shown in FIGURE 3, the upper housing member 50 is mounted on the upper surface of the platform 36 immediately above the lower housing 52 so as to define the pump housing 48 (FIGURE 1) therewith. More specifically, the flange 80 of the upper housing member 50 is suitably secured in a substantially permanent manner, as by a suitable adhesive or solvent bond, to the upper surface of the platform 36. In this connection, it will be understood that the platform 36 and each of the upper and lower housing members are preferably formed, as by molding or otherwise, from a suitable plastic, the receptacle 24 also being formed of suitable material for a filter housing, preferably a transparent plastic. It will be noted from FIGURE 3 that the rim or flange 80, as also seen in FIGURE 2, does not extend completely about the encompassing wall 74. However, at the portion thereof which is not provided with a flange portion 80, the encompassing casing wall 74 is in frictional engagement with the water-flow-directing portion 82. Consequently, it will be apparent that with the upper housing member 50, substantially permanently secured to the upper surface of the platform 36 and with the lower housing member 52 removably secured to the lower surface of the platform 36, so that the upper and lower housing members are in vertical alignment with the aperture 68 therebetween, there is defined the previously mentioned pump casing 48.

As here shown, the movable parts of the pump 46 comprise an impeller 84 and a rotor 86, as shown in FIGURE 2. The impeller 84 comprises a hollow shaft 88 having, as here shown, three radially-spaced, outwardly-extending integral impeller blades 90. It will also be noted that a water circulation slot 93 is defined between each pair of impeller blades 90. Each impeller blade 90 is provided with an inwardly-extending fin 92. The blades and fins are preferably formed integral with the shaft 88, the entire impeller 84 being preferably molded from a suitable plastic material. Consequently, it will be apparent that the impeller 84 comprises a hollow shaft 88 which is open at the lower end 93 thereof and which is provided at the upper end thereof with a wall 94 in which there is defined a central aperture 96 (FIGURE 3), the impeller having three radially-related, outwardly-extending impeller blades 90 at the closed upper end thereof, and there also being provided three radially-related fins 92 which extend into the hollow interior of the shaft 88 at the upper end thereof, there being a fin 92 continuous with impeller blade 90 (FIGURE 7).

As here shown, the rotor 86 comprises a preferably ceramic magnet 98 which is mounted on a hollow, preferably plastic, sleeve 100. The ceramic magnet 98 is of well-known construction and, more specifically, the magnet is of the type which is polarized with alternate north and south poles on the lower face 102 thereof. It will be noted that the hollow sleeve 100 extends above the upper surface 104 of the magnet and the rotor 86 is assembled with the impeller 84 by frictionally engaging the projecting portion of the sleeve 100 into the hollow shaft 88 through the open bottom 93 thereof, it being understood that the sleeve 100 will have a relatively tight adhesive or solvent bonded engagement within the hollow shaft 88.

Provision is made for a bearing assembly which is generally indicated by the reference numeral 104a for the rotor-impeller assembly 84–86. Said bearing assembly comprises a vertically-extending bearing member preferably formed by a metal ferrule 106 having a top flange 108 on which there is mounted a ball 110 preferably formed of hard rubber or a suitable plastic.

In order to mount the impeller-rotor assembly, the vertical bearing shaft 106 is seated within the previously described bearing seat 58, the lower end of the shaft extending into the seat, as best shown in FIGURE 3. The ball 110 is urged or forced into position so that it is firmly seated or engaged between the inner ends or free ends of the three radially-related, inwardly-extending fins 92, it being noted that the bearing shaft 106 extends through the rotor sleeve 100 and the hollow impeller shaft 88. Consequently, it will be apparent that the ball 110 which is frictionally engaged with the fins 92 of the impeller 84 mounts both the latter and the rotor 98 on the head 108 of the bearing shaft 106.

In order to operate the centrifugal pump 46, provision is made for an electric motor 114. The motor 114 is mounted within a motor housing 116. In order to mount the housing 116, the filter receptacle 24 is provided at the outer surface of its bottom wall 34 with a mounting plate 118 (FIGURE 11) in which there is defined at elongated slot 120. The housing 116 for the electric motor 114 is provided with a plurality of hangers 122 (FIGURE 8) by means of which the motor housing 116 may be mounted on the mounting plate 118. It will be noted that the housing 116 is provided on the upper wall 124 thereof with a raised integral portion 126 (FIGURE 11) which is dimensioned to fit within the slot 120, as best shown in FIGURE 11. The motor 114 is provided with a shaft 128 (FIGURE 8) at the upper end of which there is mounted a ceramic magnet 130 which is disposed by the shaft 128 within the upwardly-raised portion 126 of the housing 116, as shown in FIGURE 8. It will be understood that the magnet 130 is the same type of magnet as the previously mentioned magnet 98, preferably a ceramic magnet which is oppositely polarized at its outer face or upper face 132 (FIGURE 3.) It will be noted from FIGURE 2 that the motor housing 116 is slidably movable by means of its hangers 122 on the mounting plate 118. In other words, the housing 116 may be slid in the direction of the arrow 134 in FIGURE 2 from the full-line position thereof to the broken-line position thereof and back to the full-line position thereof, so that the housing 116 may be placed along the mounting plate 118 to secure optimum magnetic coupling between the magnets 130 and 86 so as to provide maximum coupling between the confronting faces 132 and 102, respectively, of said magnets. The motor unit may be removed easily for washing filter materials. For this purpose, and as previously indicated, the upper wall 124 of the casing 116 is provided with the previously mentioned raised portion 126, into which the magnet 130 extends so as to physically dispose the latter as close as possible to the platform 34 and, consequently, to the rotor magnet 98. Also, for this purpose, it will be noted that the upper surface 136 is provided with a recess 138 in which there is seated the lower housing member 52 of the pump housing 48, as best shown in FIGURE 3. Consequently, the rotor magnet 98 is brought as close as possible, by this means, to the bottom wall 34 of the receptacle 24. Thereafter, as previously indicated, the housing 116 is placed longitudinally of the bottom wall 34 so as to dispose the cooperating, motor-driven magnet 34 as close as possible and in alignment with, the rotor magnet 98, to provide for maximum magnetic coupling between the two magnets.

It will be noted that the shaft 128 of the motor 114, which mounts the magnet 130 at the upper end of the shaft, is provided at the lower end of the shaft with a magnet sequencing wheel 138. As best shown in FIGURE 6, the motor housing 116 is provided with the slot 140 through which portions of the wheel or disc 138 extend for a purpose which is hereinafter described in detail.

The receptacle 24 is provided with conventional filter material. More specifically, with the platform 36 mounted in the filter receptacle 24, the platform is first provided with a supply of charcoal 142 which is spread over the upper surface of the platform and a supply of glass wool 144 is disposed over the charcoal in a conventional manner.

A clean water return tube 146 is mounted within the previously mentioned tubular extension 76 of the upper casing member 50, being seated on the detent 78 therein. At the upper end thereof, the water conduit 146 is provided with a bend 148 which extends over the rim 28 on the upper marginal edge of the wall 30 of the aquarium tank 20, so that the outlet end 150 of the conduit 146 overlies the interior of the tank, as best seen in FIGURE 8. At its outlet end, the conduit 146 mounts a venturi type aerator 152. As best shown in FIGURES 8 and 8A, the aerator 152 is provided with a central passageway 154 through which the water flows, as indicated by the arrow 156 and is provided also with an air inlet 158 through which air is sucked into the passageway 154 by the passage of water therethrough in the direction of the arrow 156.

The aquarium tank 20 is provided also with a conventional siphon tube 160. At its lower end, the siphon tube 160 mounts a transition sleeve 162 in which there is mounted a two-part apertured housing 164 having the companion housing portions 166 and 168. Each of the housing parts 166 and 168 is provided with a plurality of apertures 170, it being understood that said housing 164 is also closed at its outer end 172 with a suitable aperture closure. At its upper end, the siphon tube 160 is provided with a bend 174 which extends over the rim 28 of the wall 30 of the aquarium tank 20 so that the discharge end 176 of the siphon tube extends into the filter receptacle 24. It will be understood that when the level of the water in the filter receptacle 24 is below the level of the water in the aquarium tank 20, water will pass into the siphon tube housing 164, as indicated by the arrows 178, the water passing through the openings 170 in the housing 160, said openings serving to prevent the passage into the siphon tube of fish or other aquarium inhabitants. The water then flows upwardly through the siphon tube, as indicated by the arrow 180, and is discharged into the filter receptacle 24, as indicated by the arrow 182 by conventional siphon action.

FIGURES 3, 8 and 9 indicate the various portions of the water-circulation system assembled for operation. In order to operate the system, the siphon tube is started and water is allowed to flow into the filter tank where it will reach the level of the water in the aquarium or receptacle 24. The electric supply wire or cord 184 of the electric motor 114 is connected to a suitable outlet so as to energize the motor 114. When the latter is energized, the rotor 128 thereof will rotate the associated magnet 130. Due to the magnetic coupling between the magnet 130 and the magnet 98 provided on the rotor-impeller assembly 84–86, the magnet 98 will begin to rotate so as to rotate the entire assembly. This results in the rotation of the impeller blades 90 to provide a centrifugal pump action. As the result of this centrifugal pump action, water in the clean water chamber 44 below the platform 36 is drawn through the openings 62 in the lower casing member 52, into the latter, as indicated by the arrows 186 in FIGURE 3, the water will then flow through the aperture 68 in the platform 36, as indicated by the arrows 188, the impeller blades forcing the water upwardly along the flow direction portion 82 of the platform, as indicated by the arrow 190. The water is then forced up the conduit 146, as indicated by the arrows 192, and flows through the aerator 152, being then discharged into the aquarium tank. The operation of the centrifugal pump 46 causes a relatively large and vigorous flow of water through the return conduit 148 which is supplied by the aerator in a relatively vigorous action to the aquarium tank so as to provide a constant supply of clean, aerated water. As the water is drawn from the clean water chamber 44 by the described action of the centrifugal pump, additional water from the filtration chamber 42 continues to filter through the filter material in the chamber and pass through the apertures 38 in the platform 36, as indicated by the arrows 194, to provide a continuous supply of clean water into the clean water chamber 44. The constant flow of water from the clean water chamber 44 back into the tank by means of the conduit 148 tends to lower the level of the water in the filter receptacle 24 relative to the level of the water in the tank. This results in a siphon action through the siphon tube 160 so as to provide a continuous flow of aquarium water from the aquarium back into the filter tank for the filtration and aeration of the return water back into the aquarium tank.

It will be noted that the pump assembly 48 is always completely immersed in water during the operation of the water-circulation apparatus of the present invention. As a result, there is a minimum amount of friction present in the moving elements of the centrifugal pump 46. In order to provide lubrication for this minimal amount of friction, the water flow through the centrifugal pump is sufficient. The apertures 62 are set up high to trap water which also keeps the lower section of the metal bearing 104 cool, preventing the heat generated at its upper end from being transmitted to the plastic. Furthermore, it will be apparent that if for any reason the pump 46 is jammed so that it cannot continue to rotate, there will be no resulting injury to the pump and the pump will not burn out or otherwise be damaged due to the fact that there is only a magnetic coupling between the motor 114 and the pump 46. Consequently, if the centrifugal pump for some reason does not operate, the motor 114 continues to rotate without any injury or damage to the pump. Furthermore, in the event that there is not a proper sequencing of the poles of the magnetic coupling between the motor magnet 130 and the pump magnet 98, the previously mentioned wheel 138 may be grasped so as to slow or stop the motion of the magnet 130 until it is properly sequenced and coupled with the magnet 98, at which point the wheel is fully released for the full free rotation of the motor magnet 130.

When it is desired to clean the filter assembly, it will be noted that the platform 36 may be removed as a unit with the pump assembly 46. Consequently, it will be apparent that, in essence, the platform and pump assembly form a unitary assembly which is separate from the unitary assembly formed by the motor 114 provided with the magnet 130 and mounted in the housing 116. Moreover, it will be apparent that the pump assembly may be readily and economically assembled or disassembled for inspection or replacement of parts by merely removing the lower casing element 52 from the hangers 66 provided on the platform 36. It will be noted that with the housing member 52 disengaged from the platform 36, the various parts of the centrifugal pump can be removed, it being noted that the impeller blades 90 can freely pass through the slots 70 (FIGURES 4 and 5) defined in the platform 36 either for assembly or disassembly of the centrifugal pump. Furthermore, it will be noted that the rotor assembly can lift itself away without jamming because of the uniball bearing if a particle of charcoal should find itself under magnet face 102 (FIGURE 2).

In view of the foregoing, it will be apparent that there has been illustrated and described a highly novel and efficient water-circulation arrangement for an aquarium, or the like which will provide an abundant amount of clear, clean and fresh water to the aquarium. Moreover, this will be accomplished without vibration or noise due to the utilization of a centrifugal pump which is completely immersed in the water during the operation of the apparatus and which is coupled magnetically to the driving motor. It will be understood that various changes and modifications may be made in the apparatus as described herein without, however, departing from the basic inventive concept of the present invention, as set forth in the appended claims.

I claim:

1. Aquarium filtration apparatus comprising a filter receptacle having an open top adapted to be supported on an aquarium tank, a removable platform disposed within said receptacle and spaced upwardly from the bottom of said receptacle to define a filtration chamber above said platform and a clean-water chamber below said platform, means for siphoning water from the tank into said filter chamber, said siphoning means including a siphon tube extending into said tank, said platform being apertured to provide for the flow of water from said filtration chamber into said clean-water chamber, centrifugal pump means disposed within said receptacle, said pump means including a casing having water inlet means in communication with said clean-water chamber for drawing clean water therefrom into said pump casing, said pump casing having water outlet means extending above said platform through which the clean water is returned to the aquarium tank, and an electric motor magnetically coupled to said pump through a wall of said receptacle for driving the latter.

2. In an aquarium receptacle adapted to contain a quantity of water, a water pumping arrangement, said arrangement comprising a pump adapted to be disposed within the receptacle and supported below the water level thereof, said pump comprising a casing having water inlet means and water outlet means, a rotary shaft disposed within said casing, said rotary shaft being provided with outwardly extending impeller blades at one end thereof and polarized magnet means mounted at the other end thereof, means for rotatably mounting said shaft within said casing, said casing being provided with a member having a bearing portion extending into the interior thereof, said bearing portion being in engagement with said one end of said shaft, a motor disposed externally of said receptacle, said motor being supported with respect to said receptacle and being provided with a shaft having magnetic means magnetically coupled to said pump magnet means through a wall of the receptacle for operating said pump.

3. Aquarium filtration apparatus comprising a filter receptacle having an open top formed of a plastic material and adapted to be suspended on an aquarium tank, a divider disposed within said receptacle and spaced from a wall of said receptacle to define a filtration chamber on one side of said divider and a clean-water chamber on the other side of said divider, means for siphoning water extending from the tank into said filter chamber, said siphoning means including a siphon tube having ends extending below the water level of the aquarium tank, said divider being apertured to provide for the flow of water from said filtration chamber into said clean-water chamber, centrifugal pump means including a casing mounted within said receptacle, said pump means including a casing having water inlet means in communication with said clean-water chamber for drawing clean water from said clean-water chamber into said casing and said pump casing having water outlet means through which the clean water is returned to the aquarium tank, and an electric motor mounted by said filter externally of said receptacle, said electric motor being magnetically coupled to said pump for driving the latter.

4. An aquarium filtration apparatus comprising a filter receptacle adapted to be supported on an aquarium tank, a removable platform disposed within said receptacle spaced upwardly from the bottom of said receptacle to define a filtration chamber above said platform and a clean-water chamber below said platform, means for siphoning water extending from the tank into said filter chamber, said siphoning means including a siphon tube the ends of which extend below the level of the aquarium water, said platform being apertured to provide for the flow of water from said filtration chamber into said clean-water chamber, centrifugal pump means supported within said receptacle, said pump means comprising a casing having water inlet means and water outlet means, a rotary shaft disposed within said casing, said rotary shaft being provided with outwardly extending impeller blades at one end thereof and polarized magnet means at the other end thereof, means for rotatably mounting said shaft within said casing, said casing being provided with a member having a bearing portion extending into the interior thereof, said bearing portion being in engagement with said one end of said shaft, an electric motor disposed externally of said receptacle for operating said pump, said motor being supported by said receptacle and being provided with a shaft having polarized magnet means, said motor being magnetically coupled to said pump magnet means through a wall of said receptacle for driving said pump to thereby pump water from said clean-water chamber into said aquarium tank.

5. An aquarium filtration apparatus comprising a filter receptacle adapted to be supported on an aquarium tank, a removable platform disposed within said receptacle spaced upwardly from the bottom of said receptacle to define a filtration chamber above said platform and a clean-water chamber below said platform, means for siphoning water extending from the tank into said filter chamber, said siphoning means including a siphon tube the ends of which extend below the level of the aquarium water, said platform being apertured to provide for the flow of water from said filtration chamber into said clean-water chamber, centrifugal pump means supported within said receptacle, said pump means comprising a casing having water inlet means and water outlet means, a rotary shaft disposed within said casing, said rotary shaft being provided with outwardly extending impeller blades at one end thereof and polarized magnet means at the other end thereof, means for rotatably mounting said shaft within said casing, said means including a ball, said casing being provided with a member having a ball mounting portion extending into the interior thereof, said ball being disposed between said member and a portion of said one end of said shaft, an electric motor disposed externally of said receptacle for operating said pump, said motor being supported by said receptacle and being provided with a shaft having polarized magnet means, said motor being magnetically coupled to said pump magnet means through a wall of said receptacle for driving said pump to thereby pump water from said clean-water chamber into said aquarium tank.

6. In an aquarium receptacle adapted to contain a quantity of water, a water pumping arrangement, said arrangement comprising a pump adapted to be disposed within the receptacle and supported below the water level thereof, said pump comprising a casing having water inlet means and water outlet means, a rotary shaft disposed within said casing, said rotary shaft being provided with outwardly extending impeller blades at one end thereof and polarized magnet means mounted at the other end thereof, means for rotatably mounting said shaft within said casing, said means including a ball, said casing being provided with a member having a ball supporting portion extending into the interior thereof, said ball being disposed between said member and a portion of said one end of said shaft, a motor disposed externally of said receptacle, said motor being supported with respect to said receptacle and being provided with a shaft having magnetic means magnetically coupling to said pump magnet means through a wall of the receptacle for operating said pump.

References Cited by the Examiner
UNITED STATES PATENTS

| | | |
|---|---|---|
| 2,386,505 | 10/1945 | Puchy. |
| 2,975,713 | 3/1961 | Wright _____ 103—220 X |
| 3,074,347 | 1/1963 | Clymer. |
| 3,145,168 | 8/1964 | Scafuro _____ 210—169 |
| 3,273,717 | 9/1966 | Canterbury _____ 210—169 |

REUBEN FRIEDMAN, *Primary Examiner.*

F. MEDLEY, *Assistant Examiner.*